Dec. 29, 1942.    S. RUBEN    2,306,409
PRIMARY CELL
Filed Dec. 20, 1941
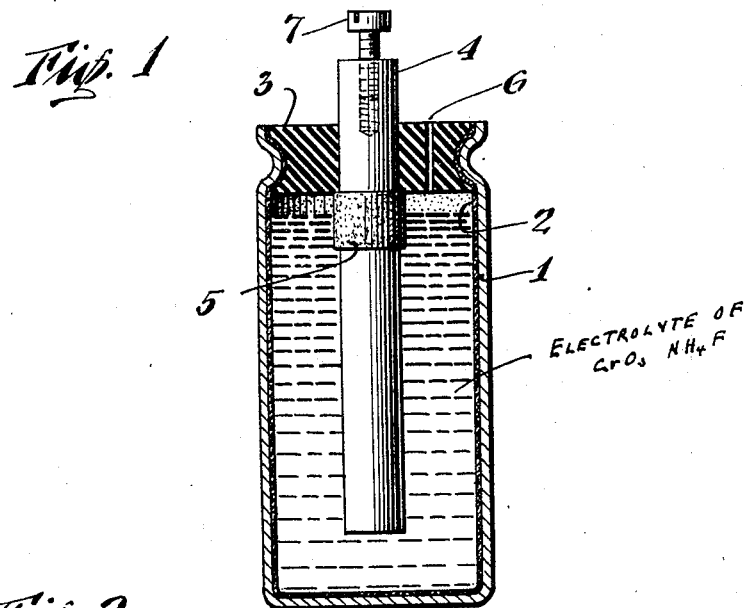
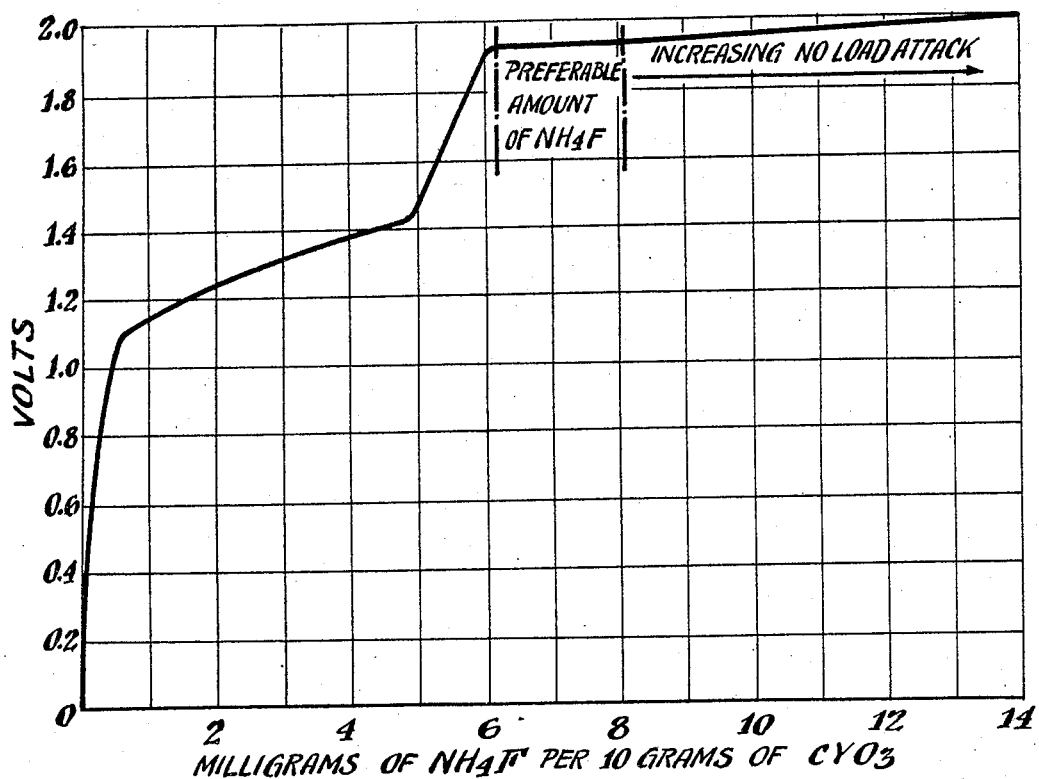
INVENTOR.
Samuel Ruben
BY
ATTORNEY Patented Dec. 29, 1942

2,306,409

UNITED STATES PATENT OFFICE 2,306,409

PRIMARY CELL

Samuel Ruben, New Rochelle, N. Y.

Application December 20, 1941, Serial No. 423,726

6 Claims. (Cl. 136—100)

This invention relates to primary cells employing an electrode of magnesium. This application is a continuation in part of my co-pending application bearing Serial Number 411,451, filed September 19, 1941.

An object of the invention is to provide a primary cell of high output, and which may be economically manufactured.

Another object is the provision of a primary cell which will maintain its potential over a substantial part of its operating life.

A further object is the provision of a primary cell capable of supplying current over sustained periods without excessive polarizing effects.

A further object is the provision of a cell having a high power output for a given weight and volume.

Another object is the provision of such a cell having a low shelf life loss.

A further object is the provision of a primary cell of novel construction.

Other objects will be apparent from the disclosure and from the drawing in which Fig. 1 is a view partly in section of a primary cell embodying features of the invention, and Fig. 2 is a graph showing operating characteristics of a cell of the invention.

In my Letters Patent Numbers 2,257,129 and 2,257,130 I describe a primary cell utilizing magnesium as the negative electrode and having an electrolyte formed from a solution of chromic acid and a fluoride of a basic ion, such as a fluoride derived from an alkali earth or alkaline metal of the first and second periodic groups of elements.

Magnesium, if used as the negative electrode in a cell having a chromic acid electrolyte and a co-operating electrode of carbon, becomes passive. No output is obtainable from the cell due to a polarizing film produced on the surface of the magnesium. The addition of a fluoride of a basic metal or ion as described in my patents referred to activates the electrolyte solution and results in a cell capable of providing voltage and current in excess of that of cells of the prior art. By control of the fluoride content to a value sufficient only to activate the cell, shelf life attack, an inherent limitation on the use of magnesium can be reduced to a negligible value.

The present application relates to and the invention comprises a primary cell employing a negative electrode of magnesium and an electrolyte formed from a solution of chromic acid and ammonium fluoride.

The ammonium fluoride, due to its high solubility, should be used within a certain range of concentration in order to avoid excessive local attack and reduced shelf life. The amount used is preferably the minimum which will activate the cell and allow electrochemical dissolution of the magnesium in the process of generating a current flow.

The relation of desirable proportions of ammonium fluoride to chromic acid can be seen in the curve of Fig. 2. For minimum shelf life attack consistent with maximum output, the most desirable concentration appears to be about seven and one-half milligrams of ammonium fluoride for each ten grams of chromic acid.

It is obvious, however, that the percentage of fluoride added to the chromic acid may be varied within wide limits to meet special requirements and applications; for example, where high current output for short periods is required the ammonium fluoride concentration can be substantially increased.

Fig. 1 of the drawing illustrates the structure of a primary cell of this invention. The inside surface of steel container 1, is sprayed with a layer of carbon 2, which is heat bonded to the steel by the addition of a chromic acid resistant binder such as 'Koroseal" (vinyl chloride). The amount of binder used is about ten percent by weight of the carbon. A thinner is employed and the mixture after it has been sprayed to the wall of the container is baked at a temperature of about 125° C. The use of this carbon coated steel surface is of considerable advantage inasmuch as the steel itself is not attacked by the chromic acid and becomes passive.

Magnesium rod electrode 4, is forced through top sealing plug 3, composed of solid "Koroseal." The magnesium rod has a partial coating of "Koroseal" 5, so that the electrolyte is above the exposed end of the magnesium, thus preventing corrosion at the air line due to the formation of magnesium oxide in contact with the air. This protection of the magnesium reduces shelf life loss considerably. The vent 6, is employed to allow escape of any uncombined gases. This vent may be in the form of a porous "Koroseal" plug which under normal conditions will not allow liquid to pass out of the cell but will allow escape of any accumulated gases.

Screw 7 provides a convenient terminal for the magnesium electrode.

The electrolyte in the cell is formed from ten grams of chromic acid, thirty m. l. of distilled water and six milligrams of ammonium fluoride.

The chromic acid, ammonium fluoride and water are mixed together to form the electrolyte solution which is then filtered through a ceramic type filter. I have found in order to minimize local corrosion, that freedom from insoluble or floating particles is highly desirable if not necessary in the electrolytes of these magnesium primary cells. For this reason, careful filtering is beneficial.

While the structure of the cell described has been found to be of advantage, other structures may be utilized, for instance those shown and described in my prior patents above referred to. If desirable the electrolyte may also be immobilized, such as by the addition of inert oxides, silica gel, et cetera.

What is claimed is:

1. A primary cell comprising a negative electrode of magnesium, a cooperating positive electrode and an electrolyte comprising a solution of chromic acid and ammonium fluoride.

2. A primary cell as described in claim 1 characterized in that the positive electrode is a carbon material.

3. A primary cell comprising an electrode of magnesium, a cooperating electrode and an electrolyte comprising a solution of chromic acid and ammonium fluoride, the chromic acid being present in a preponderant percentage.

4. A primary cell having an electrode of magnesium, a cooperating electrode, and an electrolyte comprising a solution of chromic acid and ammonium fluoride, the amount of fluoride present being sufficient to permit said chromic acid to become active when current is drawn from the cell.

5. A primary cell comprising a container, the inside wall of which is coated with carbon constituting the positive electrode, a negative electrode of magnesium and an electrolyte comprising chromic acid and ammonium fluoride.

6. A magnesium primary cell having an electrolyte comprising an aqueous solution of ammonium fluoride and chromic acid, the proportion being about 7½ milligrams of ammonium fluoride to about ten grams of chromic acid.

SAMUEL RUBEN.